April 29, 1941.   J. M. GWINN, JR   2,240,258
AIRCRAFT
Filed June 22, 1937   3 Sheets-Sheet 1

INVENTOR
Joseph M. Gwinn, Jr.,
BY
Beau, Brooks, Buckley & Beau.
ATTORNEYS

April 29, 1941.    J. M. GWINN, JR    2,240,258
AIRCRAFT
Filed June 22, 1937    3 Sheets-Sheet 2
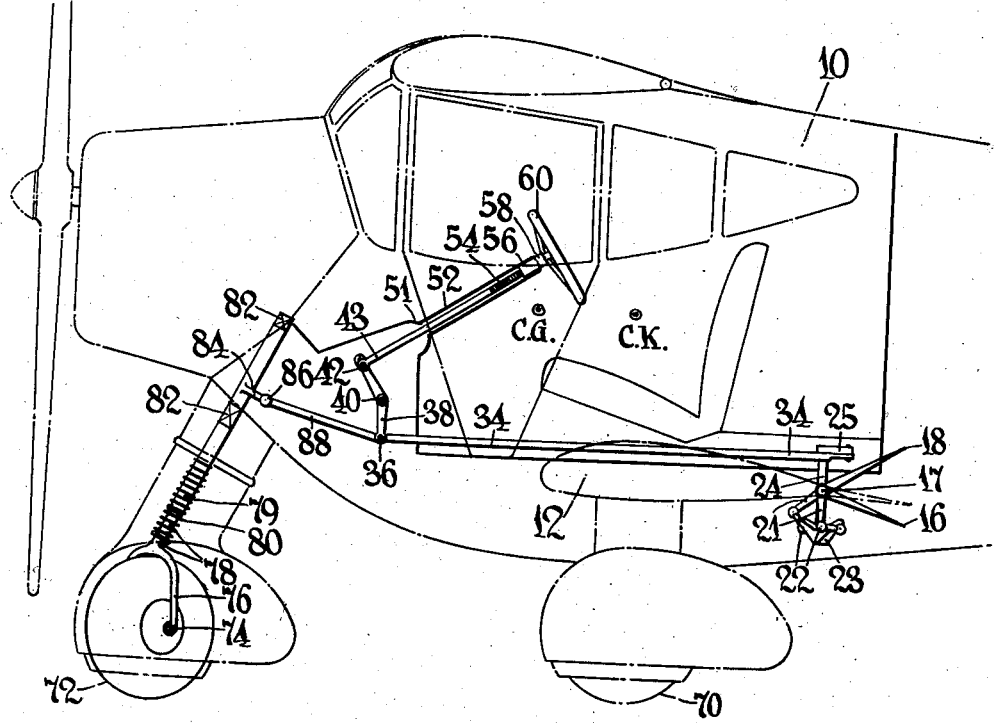
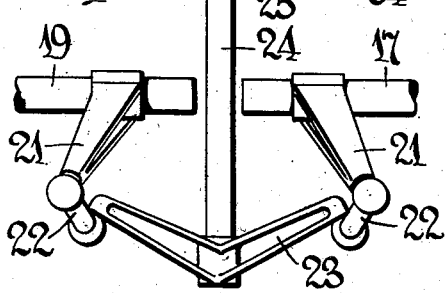
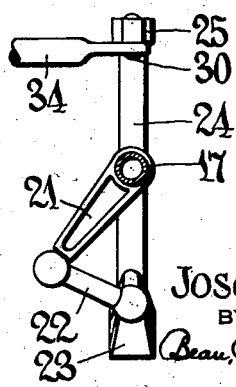
INVENTOR
Joseph M. Gwinn, Jr.,
BY
ATTORNEYS Patented Apr. 29, 1941

2,240,258

UNITED STATES PATENT OFFICE 2,240,258

AIRCRAFT

Joseph M. Gwinn, Jr., Buffalo, N. Y.

Application June 22, 1937, Serial No. 149,660

4 Claims. (Cl. 244—100)

This invention relates to control means for aircraft.

It is the present general custom to provide aircraft of the dirigible type with air rudders for directional control purposes in connection with both flying and earth taxiing conditions. During normal flight, a deflected rudder in co-operation with the longitudinal fin surfaces of an airplane creates yawing moments about a vertical axis, and if the craft is simultaneously laterally banked, as by means of ailerons, a directional turn is effected. Unfortunately, however, one of the most difficult things to learn about flying is the proper coordination of these control movements under the entire range of flying conditions, and most of the difficulties encountered in flying are caused by the improper use of these controls. For example, most present day conventional types of airplanes will go into spins only as a result of the improper use of the rudder.

For ground taxiing directional control the air rudder is also used, either alone or in combination with differentially actuated ground wheel brakes and/or independently steerable ground wheels. The air rudder is also used in the case of seaplanes to steer the craft when water taxiing, but on either land or water the air rudder is inherently incompetent for the purpose because its effectiveness depends upon relative wind velocities which are extremely variable and often insufficient to produce any turning effect whatsoever.

Differential actuating means for ground wheel brakes are sometimes attached to the rudder controls to assist in ground steering and to insure directional control ability when the rudder is ineffectual. A high degree of skill is required, however, to obtain the desired results and to apply equal braking effects on the ground wheels when so equipped to obtain an equal or straight-line braking action; and experience has shown that the use of such braking means under conditions of substantial velocity is extremely dangerous. These difficulties therefore practically prohibit the application of the brakes for slowing the airplane immediately upon landing and until the craft has slowed down considerably from other causes.

A taxiing airplane of the conventional type is dynamically unstable directionally by reason of the fact that the center of gravity of the combined airplane and its load is located behind the directionally fixed ground wheels. Hence, if the airplane starts to turn out of a straight line course from any cause the centrifugal forces acting laterally and through the center gravity of the craft tend to move the tail sidewise and to swing the airplane about the front wheels as pivots. Thus the turning forces are augmented, with the result that the pilot is called upon to apply corrective control forces requiring skillful use of the rudder. This directional instability constantly confronts the pilot with the problem of counteracting the tendency to swerve during landing and take-off ground runs.

Also, the centrifugal forces resulting from a directional turn tend to tip and overturn the craft sidewise, and because of the lateral extent of the wings of an airplane a relatively slight over-turning motion may produce disastrous results. The laterally directed components of the air forces acting upon a deflected rudder also create moments tending to tip or overturn the craft sidewise, and these factors limit the practicability of ground turns to slow velocity conditions.

During an approach to a landing the proper longitudinal control of a conventional type airplane usually involves sufficient factors to test the skill of the ordinary pilot, without attempting at the same time a directional turning maneuver. However, if a cross wind landing is being attempted the airplane is drifting sideways and to avoid trouble the pilot must turn it directly into the wind as first ground contact is made. A directional turn during the transition phase between free flight and full grounded conditions in connection with a landing maneuver presents to the pilot of the conventional airplane difficult problems with respect to the balance of the airplane by reason of conflicting forces which are suddenly imposed upon the craft. At this time the free-flight balance of aerodynamic forces is on the verge of breakdown because a stalling condition is being approached, and the pilot must respond to the results of new forces being transmitted through the landing gear by manipulating several unrelated control devices in conformity with his instinct and best judgment. After complete ground contact is effected the undercarriage supports the airplane laterally in ground parallel relation; and because of the laterally applied forces of centrifugal action and air pressure against the rudder tending to overturn the craft sidewise in connection with ground turns it is necessary that the pilot of a conventional type airplane land his craft in an area allowing him an ample run in the direction of the landing approach until the plane speed is substantially reduced before turning out of a straight line direction of travel.

These previous arrangements for directional control therefore fail to give the pilot of an airplane a sensitive and positive control means for his craft either in connection with flying or earth travel conditions, and it is highly desirable that the operator of an airplane be given a simplified and improved means whereby he may have full control of his craft at all times regardless of its speed and regardless of whether the craft is in full earth contact, or in free flight, or in the transition stage therebetween. Intermediate stages between earth travel and full flight conditions often involve alternating earth contacting and free flying conditions during appreciable lengths of time, and an ability to safely negotiate deviations from a straight course during this phase of a landing or taking-off maneuver would enable the pilot to avoid obstacles and materially increase the safety of flying. It is, therefore, also desirable that the pilot be enabled to steer his craft without restraint under all such conditions, and that the pilot operable means for controlling the direction of the craft under all conditions be centered in a single control member, and arranged in such manner that the pilot's motions to control the direction of the craft are similar under all conditions. It is also desirable that the directional control means should automatically induce forces acting about the rolling axis of the airplane to provide a proper lateral attitude in connection with directional turns under all flight and earth taxiing conditions.

It is an object of this invention to eliminate the foregoing inherent disadvantages and hazards of conventional types of airplanes and to obtain the desired results above set forth; and to this end to provide an improved control means for aircraft characterized by a single pilot-operable control member for the actuation of airstream responsive directional and lateral control means supplemented by earth contact directional control means for controlling the direction of the airplane travel, and, at the same time, automatically providing a proper lateral attitude of the aircraft, whether travelling under full flight or earth contacting conditions, or the transition stage therebetween.

The invention is exemplified in an airplane comprising a structure having a center of keel area disposed aft of the center of gravity of the combined aircraft and its load, and conventional type sustaining wings and elevational control means. The term "keel area" is intended to mean the area of the airplane projected on the plane of symmetry as used in the text book entitled "Aircraft Construction," by Lieut. Comdr. F. P. Thomas, published 1929 by the U. S. Naval Institute. The term center of "keel effect" as used hereinafter, is intended to mean the position of the center of pressure resulting from relative wind forces against the keel area. Movable airfoils are connected to a pilot control member for movement to adjusted positions for setting up rolling moments about a longitudinal axis of the airplane whereby both lateral balance and directional control may be effected. Ground wheels are arranged upon the structure in such manner that one or more thereof are directionally pivotable to assist in steering the craft under grounded conditions. The steerable wheel or wheels is connected to the above mentioned pilot control member in such manner that movements of the control member cause the movable airfoils and the ground wheels to move simultaneously in directionally concordant relation. In the case of seaplanes, floats supplant the ground wheels and water rudders interconnected with the airfoil actuating means are utilized for taxiing steering purposes.

The movable airfoils are arranged for movement in such manner that they simultaneously provide rolling moments about the longitudinal axis and yawing moments about the vertical axis of the airplane, the moments being preferably complementary to cause the craft to turn directionally. If the maneuver is executed under flying conditions the airplane is thereby automatically banked; and if executed when taxiing, an earth-parallel lateral attitude is thereby automatically maintained. No air rudder is necessary, and in connection with preferred conditions of aerodynamic design it is preferred that none be used, but under other conditions a rudder may be included to supplement the action of the other control means. The undercarriage is preferably so arranged upon the structure that when the craft is grounded the main sustaining wings are supported at a relatively low lift attitude.

In the drawings:

Fig. 3 is a fragmentary side elevation on a larger scale, partly in elevation and partly in section of an airplane incorporating control means embodying the invention;

Fig. 4 is a fragmentary detail of the control mechanism on an enlarged scale;

Fig. 5 is a fragmentary side view of the mechanism shown in Fig. 4; and

Figure 1:
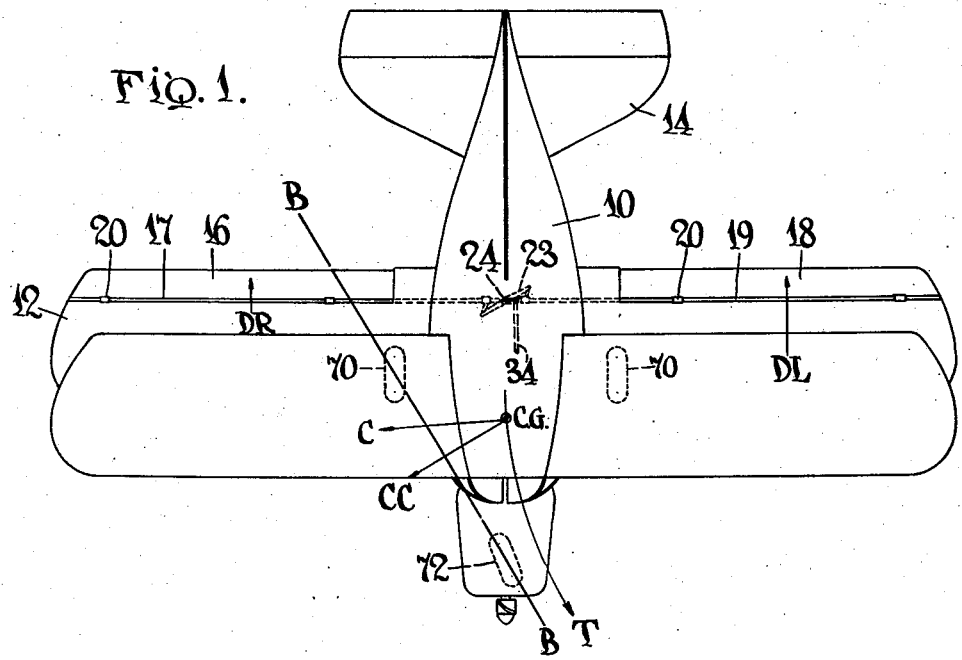
Fig. 1 is a diagrammatic plan view of a land plane embodying the invention and showing schematically the disposition of laterally directed forces in effect during a directional turning movement to the left.

In practicing the invention, an airplane structure having a composite keel area, the center of pressure effect of which is located at some point aft of the center of gravity C. G. of the combined airplane structure and its load, such as at C. K., is provided with otherwise conventional structural members including a fuselage 10, laterally extending main sustaining wings 12, and a horizontal tail surface 14. The airplane may be of any general type, such as a bi-plane as shown, or of any other wing type. Right and left wing flaps 16 and 18 respectively, are hingedly mounted upon the trailing edges of opposite portions of the main wings 12, in a manner somewhat similar to conventional aileron mounting practice. As illustrated in Figs. 1 and 3, the wing flaps 16 and 18 may be mounted upon the rear edges of the wing 12 by means of torque tubes 17 and 19, respectively. The torque tubes 17 and 19 are journalled to the wing 12 by means of bearings 20. The flaps 16 and 18 are each provided with actuating means connected to a common pilot control member which may be of any convenient form, such as a wheel 60 herein illustrated.

Wing flap actuating means connecting the pilot control wheel 60 and the wing flaps 16 and 18 for simultaneous opposite differential movement of the flaps are illustrated as comprising an arm 21 extending rigidly from the inner ends of each of the torque rods 17 and 19 and downwardly for connection through swivel connecting links 22 to opposite ends of a cross bar 23. The bar 23 is rigidly mounted transversely of a post 24 which is pivotally mounted upon a suitable bearing support (not shown) on the fuselage 10. The upper end of the post 24 is provided with a laterally extending arm 25 rigidly mounted thereon, and the outer end of the arm 25 is pivotally connected by a pin 30 to a push-pull tube 34, the other end of which is pivotally connected by means of a pin 36 to one end of a bell crank 38. The bell crank 38 is pivotally mounted to the fuselage 10, as at 40, and is connected at its opposite end by means of a lateral motion connection 42 to one end of a control rod 43 which is supported in telescopic relation within a control column 52. The control column 52 is supported as at 51 upon a portion of the fuselage 10. The upper end of the control rod 43 is provided with a threaded portion 54 for threaded cooperation with an interiorly threaded hub portion 56 of the control wheel 60. The wheel 60 is rotatably mounted upon the end of the column 52 and retained against longitudinal movement thereon by means of a collar bearing 58.

Thus, rotation of the wheel 60 produces longitudinal movement of the rod 43 relative to the fuselage 10. This motion is transmitted through the bell crank 38 to cause longitudinal movements of the tube 34 which in turn actuates the arm 25 to cause the post 24 to rotate about its vertical axis. Thus the opposite ends of the bar 23 are moved in opposite directions, and through means of the links 22 and the arms 21 the torque tubes 17 and 19 are caused to rotate in opposite directions, to move the flaps 16 and 18 simultaneously in opposite up or down directions. The bar 23, the link members 22, and the arms 21 are preferably so arranged as to cause the flaps 16 and 18 to be moved above their neutral trailing positions (illustrated by broken lines in Fig. 3) with greater degrees of movement than when moving below their neutral positions. Thus, the raised flap creates a change in the lift characteristic of the wing to which it is attached of a magnitude greater than the change in lift characteristic of the opposite wing to which is attached the lowered flap. The principle of this particular wing flap actuating mechanism is the subject matter of another invention and is more fully described and explained in my co-pending application Serial No. 128,255, but obviously any equivalent type of reverse differential actuating means may be employed for the purpose.

Landplanes may be provided with a plurality of ground wheels which may be disposed in any desired arrangement with respect to their number and spaced relation; one or more of the wheels being mounted relative to the fuselage 10 to assist in steering the airplane under ground contacting conditions. A preferred arrangement, however, comprises a pair of spaced wheels 70 pivotally mounted upon the fuselage 10 in directionally fixed relation to the fuselage and parallel to the longitudinal axis of the airplane, and at a position aft of the center of gravity of the airplane. A single wheel 72, mounted in castering relation under the fuselage 10 at a position forward of the center of gravity of the airplane and centrally of the wheels 70, completes a three point support for the airplane upon the ground. The airplane is mounted upon the wheels 70 and 72 in such manner that when the craft is in full ground contact it is supported in substantially flying attitude, with the wings 12 disposed at relatively low angles of attack.

The castering wheel 72 is rotatably carried by means of a bearing 74 in the lower forked end 76 of a post 78. The post 78 is telescopically supported within a tubular member 79 and in longitudinally splined relation thereto. A coiled spring 80, disposed between suitable stop members on the post 78 and the tubular member 79, resiliently supports them in predetermined longitudinal relation and provides a landing shock absorbing means therebetween. The member 79 is rotatably mounted upon the fuselage 10 as by means of bearings 82, and is provided at its upper end with a crank arm 84 which extends laterally therefrom to a point of pivotal connection 86 to one end of a push-pull tube 88. The opposite end of the tube 88 is pivotally connected to the lower end of the bell crank 38 by means of the pin 36, thus providing a common connection for the means actuating the wing flaps 16 and 18 and the steerable ground wheel 72 with the single pilot control wheel member 60.

Figure 6:
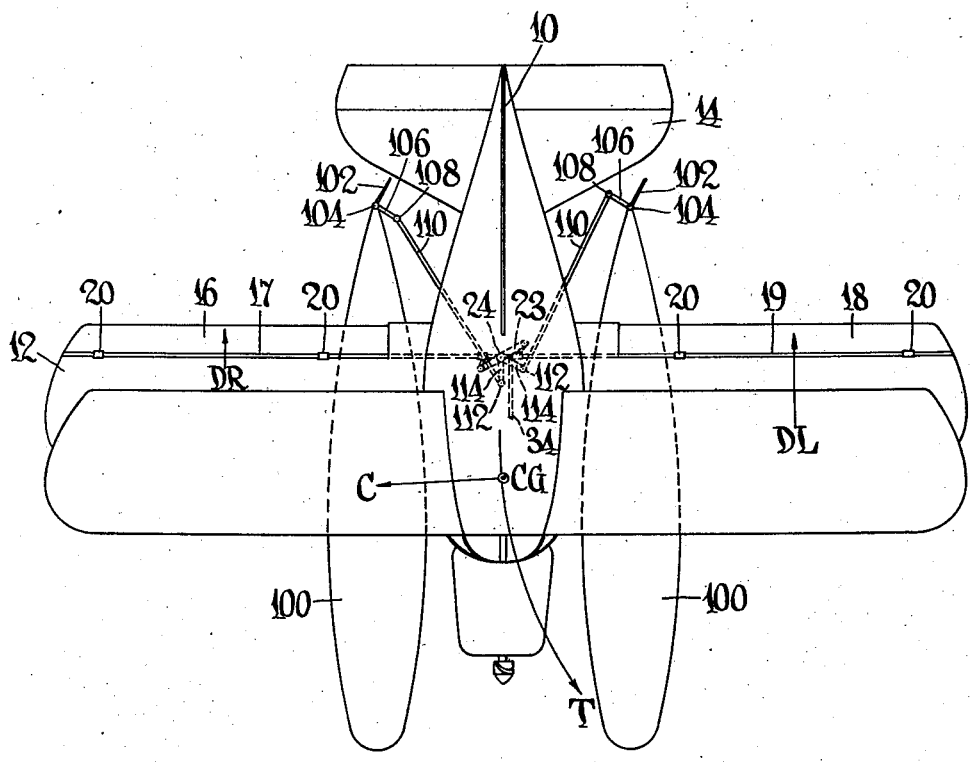
Fig. 6 is a view, similar to Fig. 1 of a seaplane, equipped in accordance with the invention.

As illustrated in Fig. 6, aircraft of the seaplane type may be equipped in accordance with the invention by providing an undercarriage including floats 100 and water rudders 102 which are pivotally connected to the structure as by means of hinges 104. Horns 106 extending rigidly from the rudders 102 are pivotally connected at 108 to push-pull tubes 110 the opposite ends of which are pivotally connected as at 112 to crank arms 114. The crank arms 114 are fixedly mounted upon and extend laterally from the vertical shaft 24 of the control actuating mechanism previously described, and in such manner that rotation of the control wheel 60 rotates the shaft 24 and through the cranks 114 moves the push-pull tubes 110 to actuate the water rudders 102 simultaneously for water taxiing steering purposes.

Figure 2:
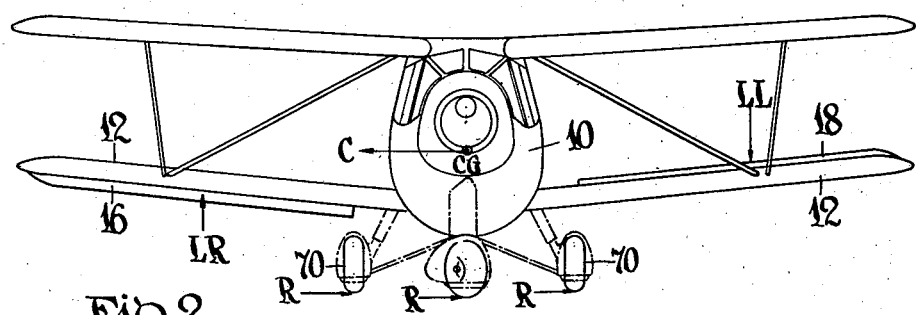
Fig. 2 is a diagrammatic front elevation of the airplane shown in Fig. 1 and illustrating the effect of the turning movement.

An airplane structure is thus provided in which the center of keel effect is located at a point behind the center of gravity of the combined airplane and its load. The pilot control wheel 60 and the members connecting it to the wheel 72 or the water rudders 102 and the wing flaps 16 and 18 enable the pilot to simultaneously actuate the control members and thereby effect directional control of the craft by simply rotating the wheel 60 to the right or left in accordance with the direction in which he desires to turn. For example, rotation of the wheel 60 to the left, or in a counterclockwise direction as viewed from the pilot's seat, causes the left wing flap 18 to move upwardly from its normal trailing position behind the main wing 12 (as shown by broken lines in Fig. 3) to a raised position such as is shown in solid lines in Figures 2 and 3. The right hand wing flap 16 is simultaneously moved downwardly about its hinged connection to the wing 12 to a position such as is also shown in Figures 2 and 3. Thus the effective camber and angles of attack of the left and right hand sections of the sustaining wings 12 extending from opposite sides of the fuselage are decreased and increased respectively. Hence the vertical lift components of the relative wind forces against the opposite wing sections are decreased and increased respectively, and when effected under full flight conditions the forces about the rolling axis of the airplane are thereby unbalanced with the result that the craft banks laterally with the left wing down and the right wing up. The banking of the airplane disposes it in a sidewise attitude, whence a side slip downwardly and toward the left commences. The keel area of the aircraft structure resists the side slip, and since the center of pressure effect against this area is located behind the center of gravity of the combined structure and its load the craft noses down and in the direction of the depressed left wing, thus turning from the original course of flight in a direction indicated by the arrow T in Fig. 1. Thus a banking maneuver caused simply by rotating the pilot wheel 60 to right or left automatically effects a deviation from the original direction of flight, and at the same time automatically provides the proper lateral attitude of the craft to prevent side slipping outwardly of the turn. The pilot is thus prevented from over controlling his craft, such as by giving it too much rudder in view of the degree of bank, as may be done when flying conventional airplanes, with the possibility of disastrous results. The wing flaps 16 and 18 may be actuated in the manner of ailerons to enable the pilot to maintain proper lateral balance during level flight.

Under ground travel conditions the airplane is steered by rotation of the control wheel 60 in a manner identical to that in which directional control is obtained in connection with full flight conditions. The members connecting the control wheel, the ground wheel 72, and the wing flaps are so arranged that the control wheel is adapted to actuate the wing flaps and the ground wheel 72 in coordinated relation, hence the pilot merely rotates the wheel 60 to negotiate a directional turning maneuver whether he is in the air, or on the ground, or in the transition stage therebetween. In all cases the turning of the pilot wheel 60 simultaneously moves the wing flaps 16 and 18 in opposite directions relative one to another, and in such manner as to provide airstream responsive means at the opposite ends of the laterally extending wings of the airplane to provide rolling moments appropriate to the maneuver being executed. For example, as illustrated in Figs. 1 and 2, when a ground turn to the left or in the direction of line T is being effected, a couple of forces tending to rotate the airplane in a counter-clockwise direction (as viewed in Fig. 2) results from a combination of centrifugal forces (indicated by line C) acting through the center of gravity C. G. and opposed laterally directed ground-reaction forces (indicated by lines R) applied at the points of wheel traction. The forward wheel 72 and the right hand rear wheel 70 provide therebetween a base line BB of support for the airplane about which the component CC of the centrifugal force C, normal to the plane of line BB, creates a moment tending to overturn the airplane sidewise. The disposition of the wing flaps 16 and 18, however, provides a couple consonant with the turn in that it tends to rotate the airplane clockwise (as viewed in Fig. 2) about its longitudinal axis, composed of an increased lift force LR created by the lowered position of the flap 16 on the right end of the wing 12 and a reduced lift or depressing force LL created by the raised position of the flap 18 on the left end of the wing.

Thus, a substantially horizontal lateral attitude of the airplane is maintained during the turning maneuver. The fact that the depressed wing flap 16 is actuated through a lesser degree of movement away from its neutral trailing position than is the raised flap 18 creates a change of drag force DL on the side of the airplane corresponding to the inside of the directional turning movement of greater magnitude than the change of drag DR produced by the flap 16, thus assisting in the turning maneuver.

As illustrated in Fig. 3, a special type of wing flap may be employed to provide favorable yawing moments without differential actuation thereof in connection with taxiing turning maneuvers. This special type of flap provides for a comparatively low section drag throughout an effective range of camber adjustment and a comparatively high section drag when the camber is adjusted beyond said effective range. A flap construction embodying this feature is described in detail and patented in my Patent No. 2,030,631, issued February 11, 1936. As will appear from an examination of Fig. 3 herein, such construction will provide no substantial convex discontinuity of the upper surface of the combined wing and flap when depressed as to the position shown and indicated by the numeral 16. Hence, when the flap is in this lowered position, the effective camber of the combined wing and flap is increased in proportion to the discontinuity of the lower surfaces thereof without having also provided the usual amount of convex discontinuity of the upper surfaces thereof. When the oppositely disposed flap is moved upwardly a convex discontinuity is immediately produced in its lower surface, provided the neutral position of the flap is such that the lower surfaces of the wing and the lap are in substantial continuity. This result is obtained by reason of the fact that at the hinge the included angle between the upper and lower surfaces of the flap is algebraically less than the angle between the upper and lower surfaces of the wing 12. Hence, an increased section drag on the side of the raised flap is produced which greatly overbalances the but slightly increased section drag on the opposite side of the airplane produced by the lower flap, and consequently a yawing moment, tending to rotate the airplane in the direction of the turn produced by the simultaneous actuation of the steering wheel 72, is produced. It will be apparent that displacement of conventional type flaps from neutral will provide substantial convex discontinuity in either the upper or lower surfaces of the combined airfoil. Conventional constructions would, therefore, produce substantially equally increased section drags with equal and opposite motions away from neutral and would require differential movement to provide favorably directed yawing moments.

To reduce aerodynamic turning moments upon the airplane resulting from cross wind pressures which tend to swerve the airplane when taxiing, the directionally fixed wheels 70 are arranged under the fuselage 10 at a longitudinal position below the approximate location of the center of keel effect C. K. It is known that the location of the center of keel effects moves longitudinally relative to the airplane with changes in the angle of yaw. At high taxiing speeds such as just prior to take-off and immediately after landing, this angle of yaw is relatively small even though the direction of the taxiing travel is substantially across the wind because it is determined by the direction of the vector resultant between the wind velocity and the airplane velocity. Hence it is preferred that the directionally fixed wheels be located below the median of the region of the center of keel effects encountered in connection with the smaller angles of yaw as in the case of cross wind take-offs and landings, which normally will be less than 20 degrees of yaw. Such an arrangement provides a balance of cross wind pressures fore and aft of the line of the wheels 70, and thus the dangers and difficulties of yawing moments due to cross wind forces ordinarily encountered in connection with cross wind take-offs and landings are reduced. Obviously the invention may be applied with equal facility to airplanes employing skis or any other equivalent ground contacting means in place of wheels as shown and described herein.

In the case of seaplanes, the water rudders 102 provide steering means for purposes analogous to those of the pivotable ground wheels in land planes. The coupling of the water rudder actuating means with the flap actuating means provides a coordinated directional and lateral control for procuring the same desired results in connection with water taxiing turns as described above in connection with land taxiing turns.

The terms "earth" and "earth surface" as used throughout the specification and claims herein are intended to cover both land and water elements.

Although only one form of the invention has been shown and described in detail, it will be apparent to those skilled in the art that the invention is not so limited but that various changes can be made therein without departing from the spirit of the invention or from the scope of the appended claims.

I claim:

1. In an airplane, earth surface supporting means including a directionally fixed element and a steerable element, said directionally fixed element being located longitudinally of said airplane at a position substantially under the location of the center of pressure of side forces in yaw upon the airplane prior to stalling in yaw.

2. In an airplane, earth surface supporting means including a directionally fixed element and a castering element, said directionally fixed element being located longitudinally of said airplane at a position substantially under the location of the center of pressure of side forces in yaw upon the airplane prior to stalling in yaw.

3. In an airplane, ground supporting means including a directionally fixed element and a steerable element, said directionally fixed element being located longitudinally of said airplane at a position substantially under the location of the center of pressure of side forces in yaw upon the airplane prior to stalling in yaw.

4. In an airplane, earth surface supporting means including a directionally fixed element and a steerable element, said directionally fixed element being located longitudinally of said airplane at a position substantially under the location of the center of pressure of side forces in yaw upon the airplane prior to stalling in yaw, and at a substantial distance rearwardly of the center of gravity of said airplane.

JOSEPH M. GWINN, Jr.